Jan. 30, 1940. J. M. LARSON 2,188,542
THERMOSTATIC CONTROL APPARATUS
Filed March 30, 1936   3 Sheets-Sheet 2
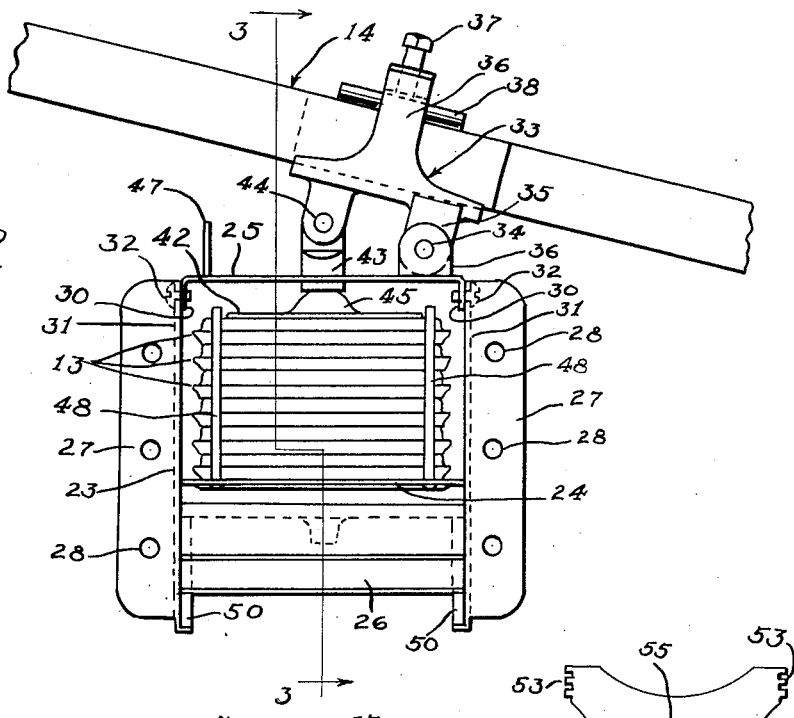
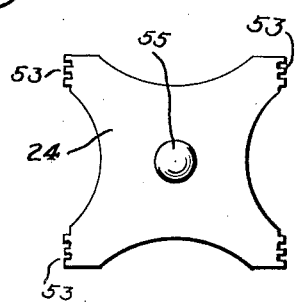
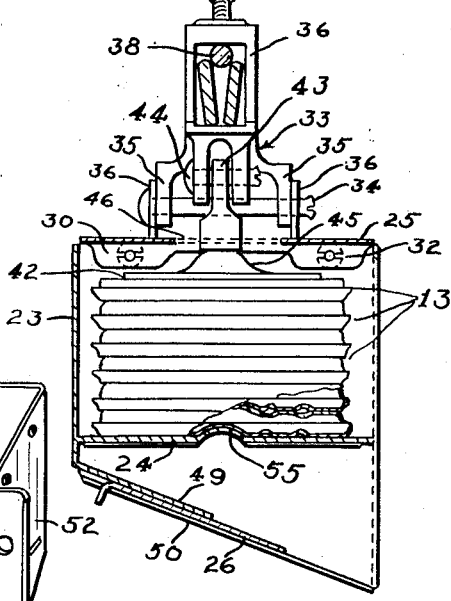
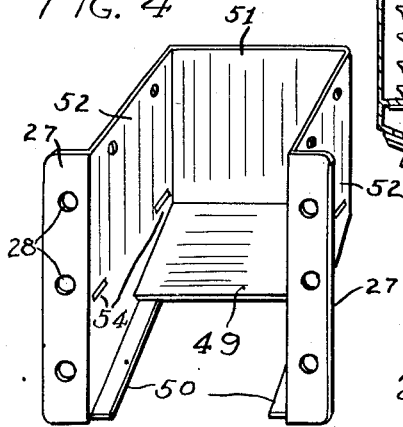
John M. Larson
by Jones, Addington, Ames & Seibold
attys

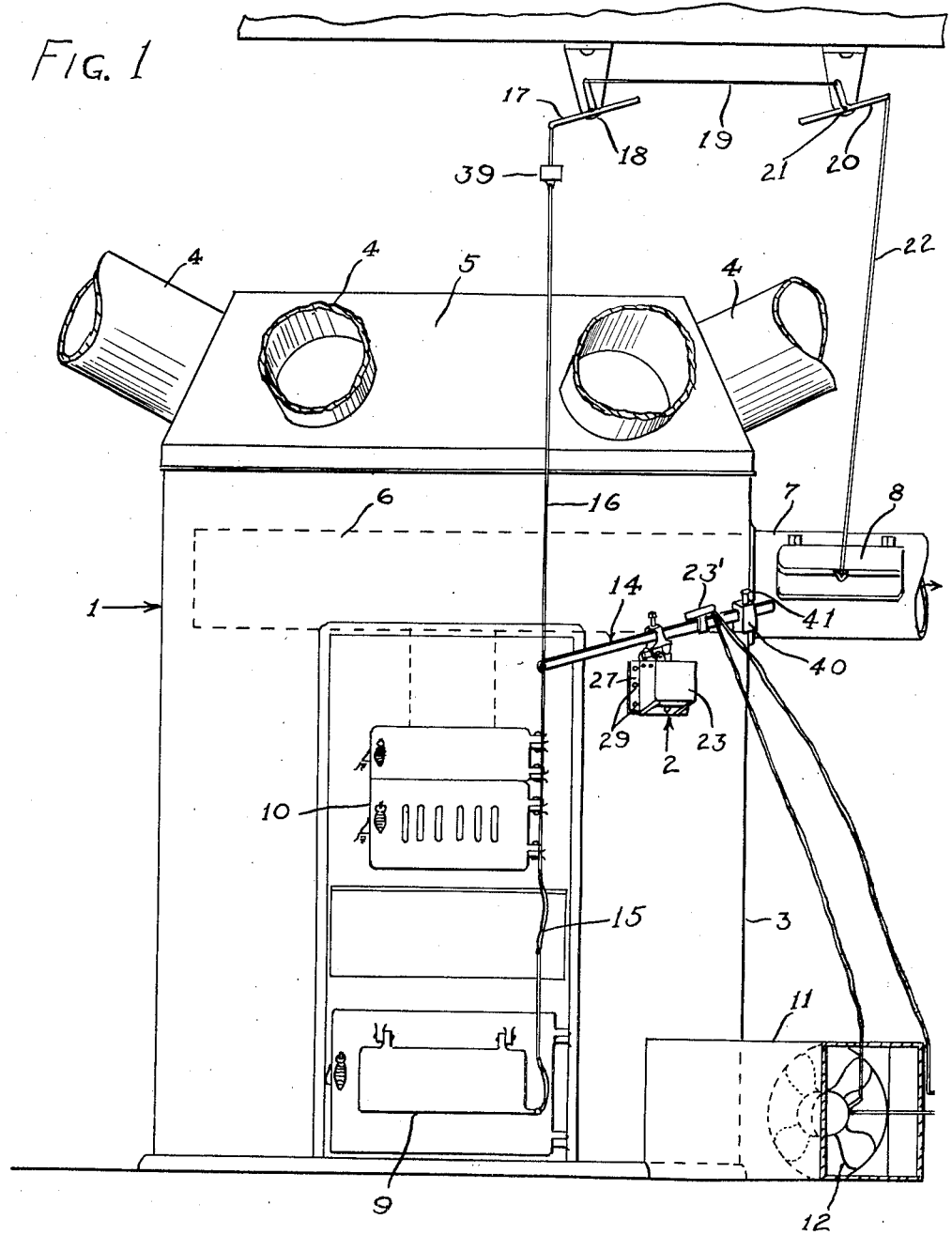

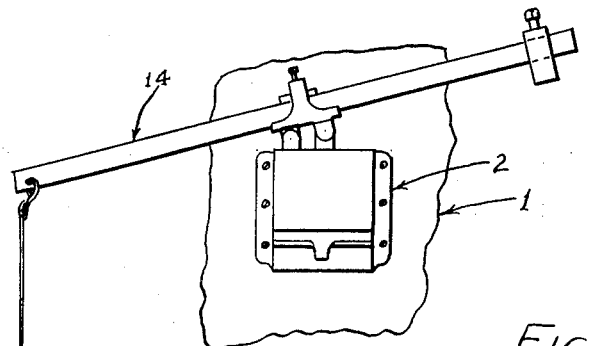
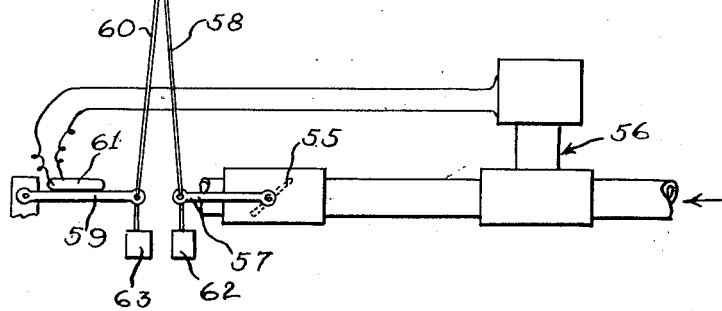
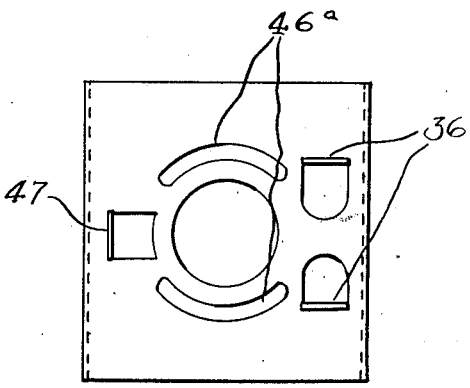

Patented Jan. 30, 1940

2,188,542

UNITED STATES PATENT OFFICE 2,188,542

THERMOSTATIC CONTROL APPARATUS

John M. Larson, Chicago, Ill., assignor, by mesne assignments, to Minneapolis-Honeywell Regulator Company, Minneapolis, Minn., a corporation of Delaware Application March 30, 1936, Serial No. 71,567

2 Claims. (Cl. 297—8)

My invention relates to thermostatic control apparatus.

One of the objects of my invention is to provide an improved thermostatic control apparatus for warm air furnaces which is so constructed and positioned that it will be thermally affected by a number of influences such as the heat transfer by conduction from the furnace casing to the regulator casing, radiant heat from the furnace casing and regulator casing, heat transfer controlled by the return air supply, basement or furnace room temperature and outdoor temperature. By reason of the effect of these various controls, I am enabled to provide a thermostat which will give proper room temperature regardless of outdoor temperatures within ordinary ranges and which will prevent excessive bonnet temperature in the furnace.

A further object is to provide an improved thermostatic regulator in which the thermostatic actuator may be subjected in a controlled manner to the temperature of the air in the furnace room.

A further object of my invention is to provide a thermostatic actuator in which the controlling lever may be mounted in either one of two positions with respect to the thermostat casing, thus enabling the device to be used either as a right-hand or left-hand controller and facilitating its installation in the desired location.

A further object of my invention is to provide a thermostatic device for controlling warm air furnaces which will be durable and efficient in use.

A further object is to provide such a construction which will have ample strength and be inexpensive to manufacture.

A further object of my invention is to provide a thermostatic device for warm air furnaces which can be easily installed on the side of the air-heating chamber, with sheet metal screws, without the use of nuts inside of the furnace wall.

Further objects and advantages of the invention will be apparent from the description and claims.

In the drawings, in which an embodiment of my invention is shown,

Figure 1 is a front elevational view showing a warm air furnace with my improved thermostatic control applied thereto;

Fig. 2 is a rear elevational view of the thermostatic control apparatus;

Fig. 3 is a section on the line 3—3 of Fig. 2;

Fig. 4 is a perspective view of the body of the thermostat casing;

Fig. 5 is a plan view of the actuator supporting shelf;

Fig. 6 is a plan view of the cover of the thermostat casing; and

Fig. 7 is a side elevational view showing the control for use with a gas-fired furnace.

Referring to the drawings in detail, and first to Figs. 1 to 6, inclusive, the construction shown comprises a warm air furnace 1, which may be of any usual or suitable construction, with my improved thermostatic control apparatus 2 applied to the side of the shell, the thermostatic control apparatus being so constructed, arranged and located that it will be subject to five heat modifying influences, including: (1) heat transfer by conduction from the furnace shell or casing to the regulator casing; (2) radiant heat from the furnace casing and the regulator casing to the diaphragm cells; (3) heat transfer controlled by the return air supply to the air heating chamber of the furnace; (4) the basement temperature or furnace room temperature on the outside of the regulator casing below the regulator affecting the diaphragms through an adjustable damper opening; and (5) outdoor temperature which affects the basement temperature, thus affecting the diaphragm cells through the walls of the regulator casing and through the damper opening.

As indicated, the warm air furnace construction may be of any usual or suitable type comprising a fire-pot or fire-box surrounded by a shell or casing 3 so as to provide an air heating chamber surrounding the fire-box, a plurality of warm air pipes 4 leading from the bonnet portion 5 of the air heating chamber, a circuitous passage 6 for the products of combustion leading from the fire-pot and located in the air heating chamber and leading to the pipe 7 going to the chimney, a check draft damper 8 on the flue gas pipe, a pivoted damper 9 for controlling the supply of air to the fire-pot, a door 10 through which fuel is supplied to the fire-pot, a return air passage 11 for supplying air to be heated to the air heating chamber, and an electric blower 12 for speeding up the flow of air to the air heating chamber.

The thermostatic control apparatus for maintaining the desired temperature is shown exercising control over the check draft damper 8, the damper 9 for controlling the supply of air to the combustion chamber and the fan 12 for speeding up the supply of air to the air heating chamber. This thermostatic control apparatus comprises a nest or stack of individual heat expansible cells 13 which act on a lever 14 in such a manner that expansion of the cells, due to heating up, will first cause the air supply damper 9 to be closed and the fan 12 to be turned off, and will thereafter cause the check draft damper 8 to be opened. The lever 14 controlled by this thermostatic apparatus is connected by a chain 15 to the swinging edge of the air supply damper 9 and is connected with the check draft damper 8 by means of a chain 16, a bell crank lever 17 pivotally mounted at 18 to which this chain 16 is connected, a link 19 pivotally connected to an arm of this bell crank lever 17, a second bell crank lever 20 pivotally mounted at 21 to which this link 19 is connected, and a chain 22 connecting this bell crank lever 20 with the swinging edge of the check draft damper 8. The booster fan 12 may be controlled by a mercury switch 23' mounted on the thermostatically-controlled lever 14 which will put the booster fan in operation if conditions are such as to require an extraordinary amount of heat and which will shut off the booster fan when the expansion of the thermostat cells reaches a certain stage.

The thermostat itself (shown in detail in Figs. 2 and 3) comprises a casing 23 which may be of aluminum or other metal having a high heat conductivity and having provisions for securing it to the side of the air heating chamber of the furnace, a plurality of unit expansible cells 13 seated on a shelf 24 in the casing, the control lever 14 pivotally mounted on the detachable cover 25 of the casing and controlled by the expansion and contraction of the cells 13, and an adjustable damper or valve 26 for controlling the admission of furnace room air to the interior of the casing. For securing the casing to the side of the air heating chamber, it is provided with a pair of laterally extending flanges 27 having openings 28 through which sheet metal screws 29 may be inserted and threaded into openings which can easily be punched or drilled in the metal wall of the air heating chamber. This enables the attachment of the regulator to the furnace without the necessity of nuts and bolts. The regulator may be easily changed for right-hand or left-hand operation by detaching the cover 25, carrying the lever 14, turning it through 180 degrees, and securing it to the casing in this changed position. This converting of the regulator from right-hand to left-hand operation facilitates the making of the connections to the various controlled devices, regardless of the location of the control apparatus on the furnace.

In order to enable the cover 25 to be quickly removed and reconnected in changed position, it is provided with a pair of downwardly turned flanges 30 fitting inside the side walls 31 of the casing, said flanges having tapped holes into which securing screws 32 passing through the side walls may be threaded.

The actuating lever 14 is mounted in a lever holder 33 pivotally mounted on a pivot pin 34 extending through downwardly extending lugs 35 on the lever holder and through lugs 36 struck up from the sheet metal material of the casing cover 25. The lever itself is shown as made in two parts, which is an advantage in packing for shipment. The two sections of the lever overlap each other where they are secured to the lever holder 33, the overlapping portions lying within a loop portion 36 of the holder and being clamped in properly adjusted position by means of a screw 37 threaded through the upper portion of the loop and bearing on a clamping and spreading pin 38 resting on the upper edges of the lever sections, as shown in Figs. 2 and 3. This lever mounting enables the effective lengths of the lever arm sections to be varied as desired by changing the position of the lever sections with respect to the lever holder, thus enabling the desired throw of the lever to be attained. Suitable counterweights may be provided for counterbalancing the weights of the dampers, the counterweight 39 serving to substantially counterbalance the gravity action of the check draft damper and the counterweight 40 serving to act against the expansive action of the diaphragm cells and also acting as a counterweight with respect to the action of gravity on the air supply damper. The counterweight 40 is slidably adjustable along the lever 14 and may be held in adjusted position by means of a set screw 41. This adjustment enables the expansive action of the diaphragm cells 13 to be controlled. The diaphragm cells act on the lever holder through the intermediary of a pressure plate 42 lying above the uppermost diaphragm cell, which is fixedly secured to a link 43 which has a pivotal connection 44 with the lever holder 33. This pressure plate may be of sheet metal and provided with a pocket or recess 45 to receive the upwardly extending projection on the upper wall of the upper diaphragm cell. The cover of the casing is provided with an opening 46 through which the link 43 can operate, this opening also providing for the circulation of air through the casing when the damper 26 is opened. If desired, additional air circulation openings 46a may be provided in the cover, as shown in Fig. 6. In order to limit the collapse of the diaphragm cells, a suitable stop finger 47 may be struck upwardly from the cover 25 in position to engage the lever 14 when the cells 13 are collapsed to a certain extent. In order to hold the nest of cells in position in the casing for shipping and handling, a pair of retaining pins 48 may be provided, mounted on the shelf 24 on which the cells rest.

The damper or valve 26 for adjustably controlling the admission of furnace room air to the interior of the casing comprises a slide valve or shutter slidably mounted to open to any desired degree the air inlet in the lower part of the casing. This valve or shutter is slidably mounted between an inclined portion 49 of the casing and a pair of flanges 50 which extend toward each other from the side walls of the casing. The slide shutter is held in the position to which it is adjusted by friction.

The main body of the thermostat casing, shown in perspective in Fig. 4, may be formed of a single piece of sheet metal of good thermal conductivity, such as aluminum or the like, bent to provide a front wall portion 51, two opposite side wall portions 52, the two attaching flange portions 27 extending laterally from the side wall portions, the inclined bottom portion 47 extending from the front wall portion between the two side wall portions, and the two inwardly extending flanges 50 spaced from the bottom portion 49 to provide a guideway for the shutter 26. The shelf 24 which supports the thermostatic cells may also be a piece of sheet metal, as shown in Fig. 5, having attaching lugs 53 which may extend through suitable openings 54 in the side walls of the main casing member and may be riveted in position, the shelf having a central boss 55 which aligns with the central depression in the lowermost thermostatic cell.

In operation, an increase in temperature of the volatile liquid in the diaphragm cells 13 will cause them to expand and a decrease in temperature will cause them to contract. An expansion of these cells first closes the air supply damper 9 and thereafter opens the check draft damper 8. If the booster fan is provided, an increase in temperature will also shut off this booster fan 12. Conversely, a decrease in temperature will first close the check draft damper 8 and thereafter open the air supply damper 9 and, if a booster fan were provided, would put this fan into operation.

As previously indicated, the temperature of the cells 13 and the contained volatile liquid is subject to five different heat conditions, the net result of which control will maintain a substantially constant room temperature regardless of changes in outdoor temperature and heat demand in the room or rooms being heated. Thus, if the outdoor temperature falls, it will cause a fall in temperature of the furnace room which will affect the temperature of the diaphragm cells due to the flow of air through the adjustable shutter-controlled opening in the lower part of the regulator casing, thus tending to collapse the diaphragm cells with a consequent increase in the heat supply. The flow of air into the air heating chamber through the return air inlet also exerts its proper effect on the thermostat, since it is desirable that the thermostat should be located in a position where it will be influenced by the in-flow of this cooler air. The in-flow of this cooler air has a tendency to cause collapse of the diaphragm cells with a consequent increase in the heat supply. In this connection it is to be noted that the temperature of the return air is itself somewhat modified or affected by the outside temperature. The regulator also acts as a safety device to prevent excessive bonnet temperature since if the bonnet temperature approaches an undesirably high temperature, the effect on the thermostat will be to cut down the heat supply.

The damper on the thermostat can be used to prevent excessive temperatures on the diaphragm cells in case the thermostat is used with steel furnaces, since by opening the slide valve 26 wider the temperature range in the diaphragm cells can be controlled. This slide valve can be so set as to give the proper room temperature regardless of outdoor temperatures within ordinary ranges, due to the five controlling influences recited. The shutter or damper 26 provides an adjustment for varying the room temperature, since decreasing the effective opening serves to lower the room temperature and increasing the effective opening serves to raise the room temperature. This adjustment may be used as a day and night temperature control. In some situations it may not be necessary that the effective opening in the regulator casing be made adjustable. In the arrangement shown in the drawings, the air which enters the thermostat casing through the shutter controlled opening will be air which flows upwardly adjacent the outside of the wall of the air heating chamber below the thermostat casing, so that the temperature of this furnace room air which enters the thermostat casing will be somewhat modified or affected by the temperature of the heating chamber wall. In case of extraordinary outdoor temperatures, the counterbalancing weight 40 can be adjusted to counteract the action of the diaphragm cells. The fact that the diaphragm apparatus is made up of separate cells enables the apparatus to work with a reasonable degree of satisfaction, even if one of the cells should become defective, since the other cells will still function. Due to the construction and location of the thermostat, it will prevent the furnace from becoming overheated in bringing the room temperature up to the desired degree.

In Fig. 7 the thermostat is shown connected up for controlling a gas-heated furnace. In this construction, the thermostat 2 is secured to the casing 3 of the furnace just as in Fig. 1. The thermostat lever 14 is connected to control a damper or butterfly valve 55 which controls the gas flow to the furnace in a graduated manner and is also connected to control a switch supporting lever which controls an electrically operated on-and-off valve 56 of any suitable type. The damper controlling lever arm 57 has a flexible connection 58 with the thermostat lever and the switch controlling lever 59 also has a flexible connection 60 with the thermostat lever. A switch-controlling lever 59 also carries a mercury contact switch device 61 which controls a solenoid or the like of the on-and-off gas control valve 56.

With this construction, a rise in temperature of the thermostatic actuator will cause a lowering of the flexible connections 58 and 60, which will result in a desired movement of the levers 57 and 59, due to the counterweights 62 and 63. The first part of the downward movement of the lever 14 will cause a graduated closing action of the gas control valve 55 without affecting the shut-off valve 56. However, when the lever 59 has been lowered sufficiently to cause the opening of the contacts of the switch 61, the solenoid will be deenergized and the shut-off valve will close completely, shutting off the gas supply.

It is obvious that the apparatus can be adapted for use with any suitable type of fuel, such as coal, gas, oil, etc., combustion control apparatus suitable for the fuel used being provided and controlled by the thermostatic apparatus.

While I have shown a diaphragm actuator of the unit cell type, it is obvious that a diaphragm construction made up of connected intercommunicating cells or a single unit diaphragm of any well known type may be used.

Further modifications will be apparent to those skilled in the art and it is desired, therefore, that the invention be limited only by the prior art and the scope of the appended claims.

Reference is made to my divisional application Serial No. 274,395 filed May 18, 1939, in which the construction and application of the regulator are claimed.

Having thus described my invention, what I claim and desire to secure by Letters Patent is:

1. A regulator for controlling a heater, in combination, a housing, diaphragm means in said housing, a lever holder pivotally mounted to the outside of said housing, an actuator member extending from said diaphragm means through said housing to said lever holder for rocking said lever holder about its pivot upon expansion and contraction of said diaphragm means, a two part lever mounted on said lever holder, said lever holder having a loop portion for receiving overlapping portions of the two parts of said lever, and means for securing said overlapping portions to said lever holder, said securing means comprising an elongated clamping member extending along and bearing on the upper edges of both overlapping portions of the lever, and a screw threaded in said loop portion and bearing on said clamping member.

2. A regulator for controlling a heater, in combination, a housing, diaphragm means in said housing, a lever holder pivotally mounted to the outside of said housing, an actuator member extending from said diaphragm means through said housing to said lever holder for rocking said lever holder about its pivot upon expansion and contraction of said diaphragm means, a two part lever mounted on said lever holder, said lever holder having a loop portion for receiving overlapping portions of the two parts of said lever, and means for forcing said overlapping portions against opposite sides of said lever holder, said last mentioned means comprising means including a screw threaded in said loop portion and partially extending between said overlapping portions.

JOHN M. LARSON.